(12) United States Patent
Ozumi (10) Patent No.: US 6,785,027 B1
(45) Date of Patent: Aug. 31, 2004

(54) METHOD FOR DRIVING A CCD SOLID-STATE IMAGING DEVICE

(75) Inventor: Takehiko Ozumi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 642 days.

(21) Appl. No.: 09/717,937

(22) Filed: Nov. 21, 2000

(30) Foreign Application Priority Data

Dec. 1, 1999 (JP) .......................................... 11-342653

(51) Int. Cl.[7] .............................................. H04N 1/46
(52) U.S. Cl. ...................... 358/513; 358/514; 348/311; 348/220.1; 348/312
(58) Field of Search ................................ 358/513, 514, 358/408, 482, 483, 909.1, 906; 348/311, 243, 274, 220.1, 312

(56) References Cited

U.S. PATENT DOCUMENTS 5,208,841 A * 5/1993 Nakanishi .................... 377/60
6,618,087 B1 * 9/2003 Hokari et al. ............... 348/311

FOREIGN PATENT DOCUMENTS

KR 2001-0060310 7/2001

OTHER PUBLICATIONS

Korean Patent Office Action dated Jan. 28, 2003.

English Abstract of JP 2001-145025 which corresponds to Reference BA.

* cited by examiner

*Primary Examiner*—Kimberly Williams
*Assistant Examiner*—Negussie Worku
(74) *Attorney, Agent, or Firm*—David G. Conlin; William J. Daley, Jr.; Edwards & Angell, LLP (57) ABSTRACT

Featured is a method for driving a CCD imaging device, including a plurality of photodetector columns each including a vertical array of photodetectors, a plurality of vertical CCDs, and a horizontal CCD, in a monitoring mode where only the signal charges from some of the photodetectors are used. The method includes reading a first signal charge from any one of said some photodetectors into a corresponding first packet of a corresponding one of the vertical CCDs, dividing the first signal charge in the first packet into smaller portions and placing one or more of the signal charge portions of the first signal charge into one or more second empty packets of the corresponding one of the vertical CCDs, and vertically transferring the signal charge portions in the first and the one or more second packets by the total number of the first and second packets.

17 Claims, 9 Drawing Sheets

METHOD FOR DRIVING A CCD SOLID-STATE IMAGING DEVICE

BACKGROUND OF THE INVENTION

1. Field of the Invention

The present invention relates to a CCD (charge coupled device) solid-state imaging device for use in an image sensor. More particularly, the present invention relates to a method for driving a CCD solid-state imaging device capable of performing a high-speed pixel-decimated read operation ("monitoring mode") for use in a high pixel density digital still camera.

2. Description of the Related Art

Figure 1:
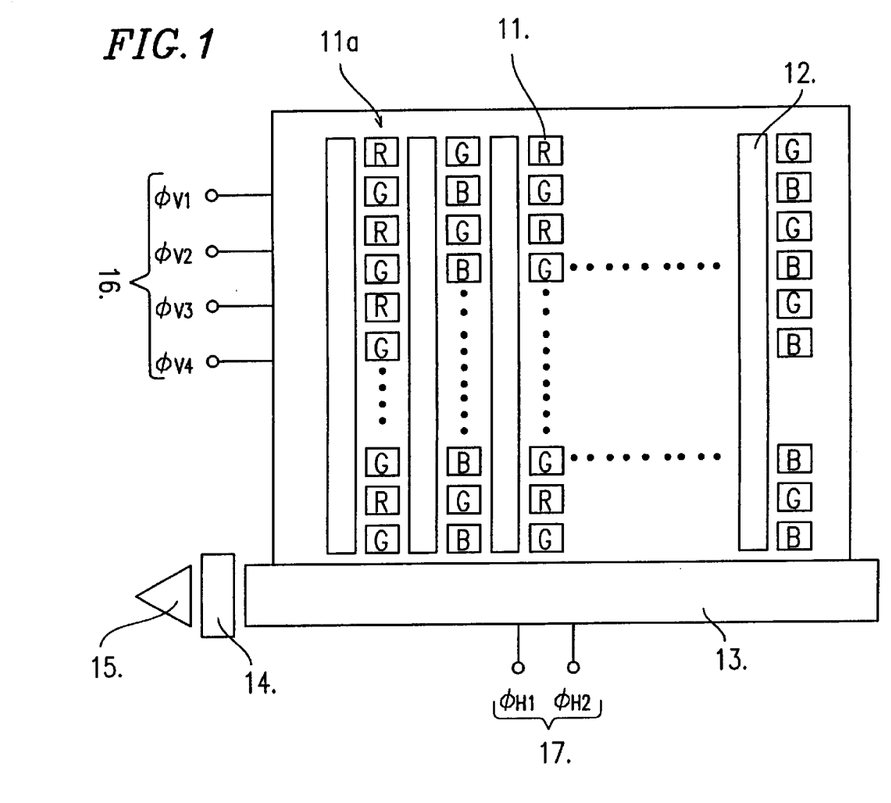
FIG. 1 illustrates the structure of a CCD solid-state imaging device.

FIG. 1 is a plan view illustrating a structure of a secondary image sensor (CCD solid-state imaging device) which is representative of CCD-based imaging devices.

The CCD solid-state imaging device includes: a plurality of photodetector columns 11a each including a vertical array of photodetectors (photodiodes) 11; a plurality of vertical CCDs 12 each for reading signal charges generated in the photodetectors 11 along one of the photodetector columns 11a; a horizontal CCD 13 for receiving signals transferred from the vertical CCDs 12 and horizontally transferring the received signals; a charge-voltage conversion section 14 for converting signal charges from the horizontal CCD 13 into voltage signals; and an amplifier 15 for amplifying voltage signals from the charge-voltage conversion section 14. The CCD solid-state imaging device further includes vertical transfer electrodes 16 (in the illustrated example, four such electrodes are provided for implementing a 4-phase driving operation) for controlling the signal charge transfer in the vertical CCDs 12, and horizontal transfer electrodes 17 (in the illustrated example, two such electrodes are provided for implementing a 2-phase driving operation) for controlling the signal charge transfer in the horizontal CCD 13.

As a color filter arrangement for the photodetectors 11 in each photodetector column 11a, an RGB (R: red, G: green, B: blue) Bayer arrangement is employed in the illustrated example. Specifically, the photodetector columns 11a include an alternating pattern of two types of vertical photodetector arrays, with the first type of array including the photodetectors 11 of R, G, R, G, . . . , G, in this order from top to bottom, and the second type of array including the photodetectors 11 of G, B, G, B, . . . , B, in this order from top to bottom.

In the field of secondary image sensors, the pixel density (i.e., the number of pixels provided per unit area of the device) has been increasing. Particularly, current main stream digital still cameras include over two million pixels therein. A commonly-employed method for driving an imaging device such as a high pixel density digital still camera is a method which allows the user to switch between a still mode and a monitoring mode. The still mode is a mode in which data (signal charges) from all pixels (photodetectors) is read out and processed, and is selected when still images are processed, e.g., when printing out a picture that has been taken. The monitoring mode is a mode in which pixel data from all pixels, is thinned or decimated so as to use only a portion of the total pixel data, and is selected when moving images are processed, e.g., when adjusting the frame to select the object to be imaged, including the background or setting, while watching the monitor output.

The still mode operation and the monitoring mode operation will now be described.

Figure 2:
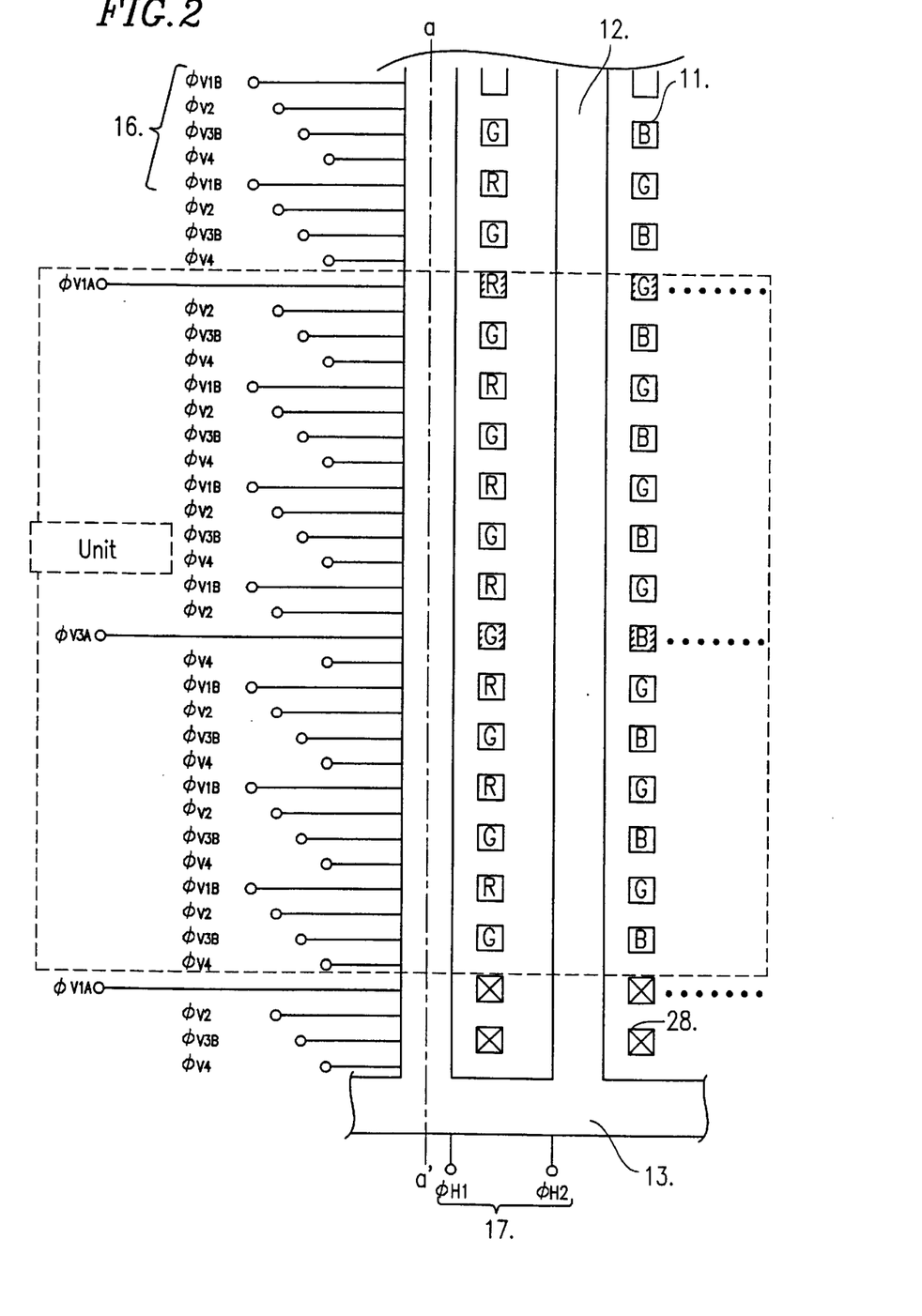
FIG. 2 is an enlarged view illustrating a portion of a CCD solid-state imaging device.

FIG. 2 is an enlarged view of a portion of a CCD solid-state imaging device corresponding to two photodetector columns. In FIG. 2, like elements to those shown in FIG. 1 are provided with like reference numerals. The CCD solid-state imaging device includes blocking pixels 28 at the bottom of each photodetector column, each of which is covered with a light blocking film to prevent light from entering the device therethrough.

In the illustrated example, the decimation ratio in the monitoring mode is 1/7, i.e., only data from one out of seven pixels (corresponding to seven photodetectors 11) is used (such an operation is referred to herein as a "1/7 decimation operation"). The vertical transfer electrodes (vertical transfer gates) 16 include six different types (phases) of vertical transfer electrodes ("6-phase gates"), i.e., $\Phi_{V1A}$, $\Phi_{V1B}$, $\Phi_{V2}$, $\Phi_{V3A}$, $\Phi_{V3B}$ and $\Phi_{V4}$, and 28 such gates are used as one unit. Alternatively, when a 1/4 decimation operation is employed, the 6-phase vertical transfer electrodes (gates) are used, and 16 such gates are used as one unit. Herein, gates $\Phi_{V1A}$, $\Phi_{V1B}$, $\Phi_{V3A}$ and $\Phi_{V3B}$ are used for reading out signal charges from photodetectors, and the other gates $\Phi_{V2}$ and $\Phi_{V4}$ are used solely for signal transfer.

(Still Mode)

Figure 3:
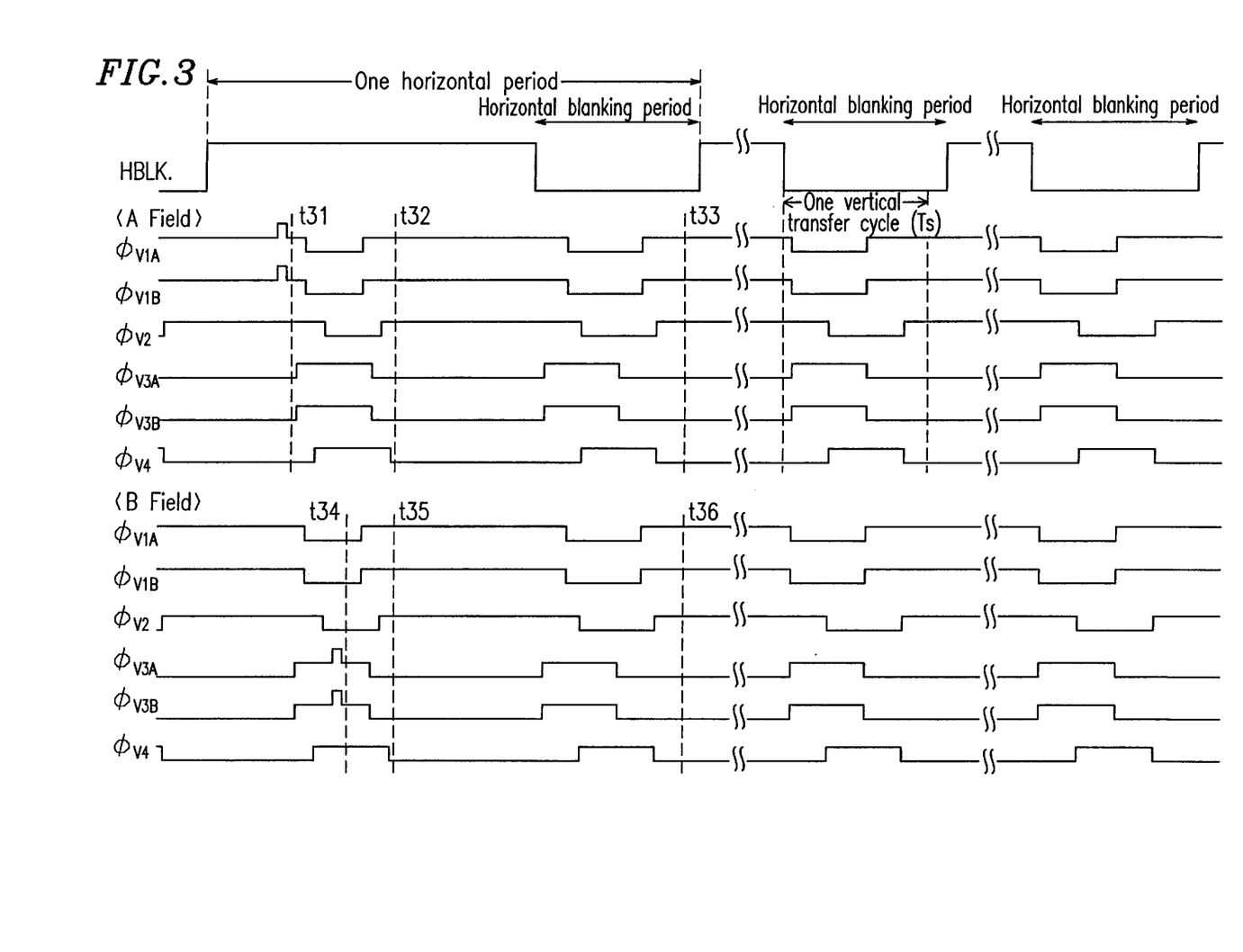
FIG. 3 illustrates a timing chart for various vertical transfer electrodes when the CCD solid-state imaging device shown in FIG. 2 is used in the still mode.
Figure 4:
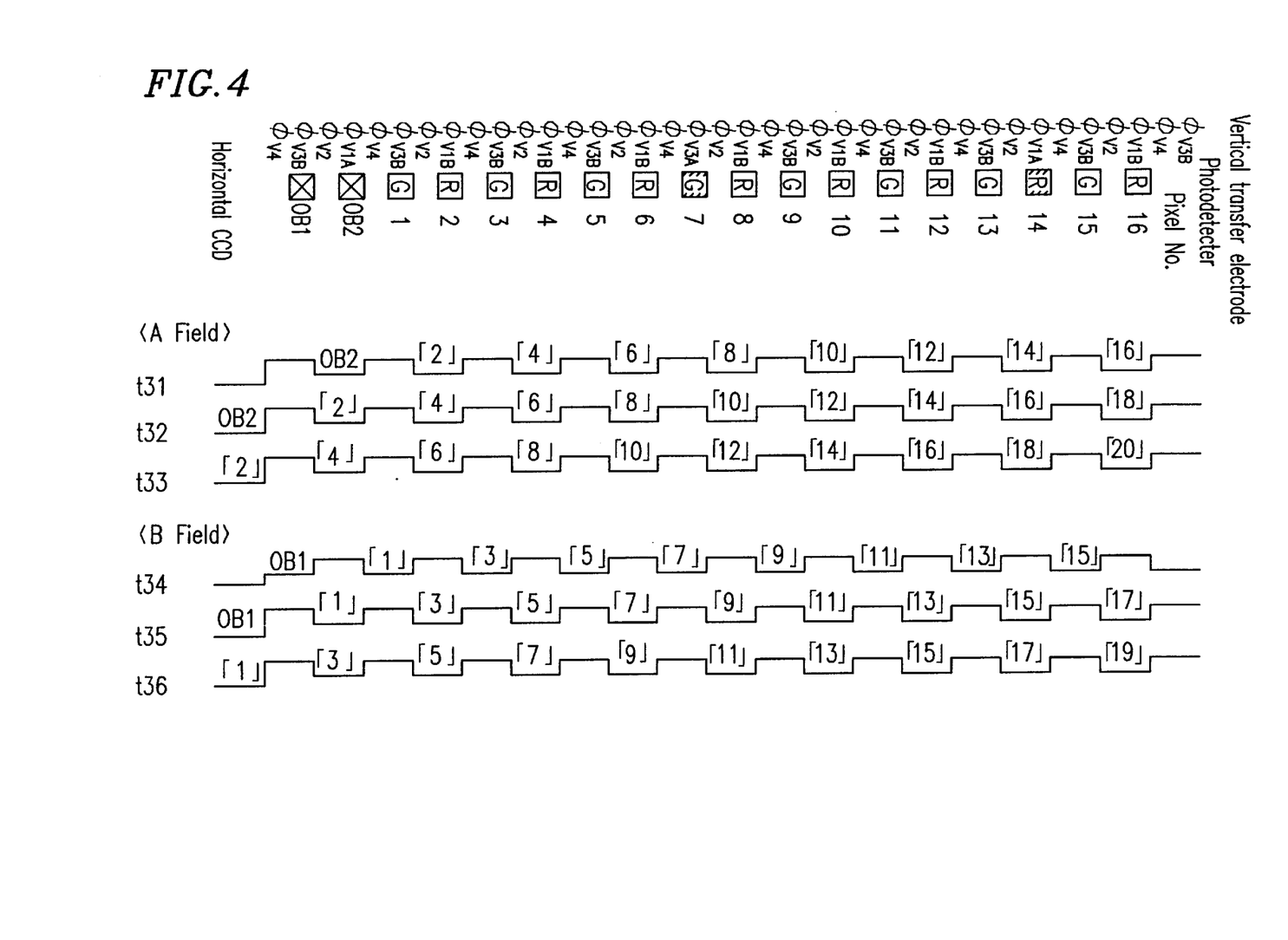
FIG. 4 is a potential diagram illustrating how signals are transferred vertically when the CCD solid-state imaging device shown in FIG. 2 is used in the still mode.

Referring to FIGS. 3 and 4, the still mode operation will now be described. FIG. 3 illustrates a timing chart for the various vertical transfer electrodes 16 for the vertical CCDs 12 in the still mode. FIG. 4 shows potential lines representing the respective potential states of the various vertical transfer electrodes 16 for the vertical CCDs 12 at each of the different points in a time period from t31 to t36 in FIG. 3.

The different periods referred to in FIG. 3 are defined as follows. The "one horizontal period" refers to a period of time starting from a read start time at which signal charges from one row of pixels, which have been received by the horizontal CCD 13 from the vertical CCDs 12, are read out to output terminals, and ending at the following read start time at which signal charges from the next row of pixels, which have been received by the horizontal CCD 13 from the vertical CCDs 12, are read out to the output terminals. The "horizontal blanking period" refers to a period of time starting from a point in time at which a clocking operation (for reading out signal charges from one row of pixels, which have been received by the horizontal CCD 13 from the vertical CCDs 12, to the output terminals) is terminated, and ending at a point in time at which a clocking operation (for reading out signal charges from the next row of pixels, which have been received by the horizontal CCD 13 from the vertical CCDs 12, to the output terminals) is initiated. The "one vertical transfer cycle" refers to a period of time in which signal charge, which have been received by the vertical CCDs 12, is transferred vertically by one packet (one step) (from the potential state of time t31 to the potential state of time t32 in FIG. 4). The term "packet" used herein refers to a potential well which is controlled by each vertical transfer electrode 16 for the vertical CCDs 12. In other words, a "packet" is a receptacle for receiving a signal charge which is generated in a photodetector (corresponding to a low potential portion of the potential line shown next to "t31" in FIG. 4, for example). Each signal charge which has been read out from a photodetector is input to a corresponding packet, and is stored therein until it is transferred to the next packet.

In FIG. 3, "Ts" denotes one vertical transfer cycle in the still mode. FIG. 4 shows potential lines representing the respective potential states of the various vertical transfer electrodes 16 of one of the vertical CCDs 12 along the line a–a' in FIG. 2. In order to read out signals from all of the R, G and B pixels, signals of two different color components are read out for each of two successive fields (A Field and B Field).

First, in the A Field and at time t31, R signal charges (⌈2⌋, ⌈4⌋, ⌈6⌋, . . . ) from the pixels (photodetectors 11) of pixel numbers 2, 4, 6, . . . (hereinafter, "pixels #2, #4, #6, . . ."), are readout from the photodetectors 11 to the corresponding packets of the vertical CCD 12 (FIG. 4) under the control of the electrodes $\Phi_{V1A}$ and $\Phi_{V1B}$. Simultaneous with this read operation, G signal charges (FIG. 2) from the adjacent column of pixels next to the column of the pixels #2, #4, #6, . . . , are read out to the adjacent vertical CCD 12 (not shown in FIG. 2) next to the vertical CCD 12 along the line a–a'.

The signal charges ⌈2⌋, ⌈4⌋, ⌈6⌋, . . . , read out at time t31 are transferred vertically under the control of the 6-phase gates $\Phi_{V1A}$ to $\Phi_{V4}$ ($\Phi_{V1A}$, $\Phi_{V1B}$, $\Phi_{V2}$, $\Phi_{V3A}$, $\Phi_{V3B}$ and $\Phi_{V4}$) within the horizontal blanking period without being mixed with one another, thereby resulting in the potential states as represented by the potential line at time t32 in FIG. 4. By repeating such an operation, all the signal charges, which have been read out from the pixels #2, #4, #6, . . . , at time t31, are read out to the horizontal CCD 13.

Similarly, in the B Field, G signal charges (B signal charges for the adjacent photodetector column) ⌈1⌋, ⌈3⌋, ⌈5⌋ , . . . , are readout from the pixels #1, #3, #5, . . . , by the electrodes $\Phi_{V3A}$ and $\Phi_{V3B}$, and are transferred vertically under the control of the 6-phase gates $\Phi_{V1A}$ to $\Phi_{V4}$.

Thus, in the still mode, a common drive timing signal is applied to the electrodes $\Phi_{V1A}$ and $\Phi_{V1B}$ and to the electrodes $\Phi_{V3A}$ and $\Phi_{V3B}$, and signals of two different color components are read out in different patterns for two successive fields. As a result, with the A Field and B Field, all of the R, G and B signals are read out.

(Monitoring Mode)

Figure 5:
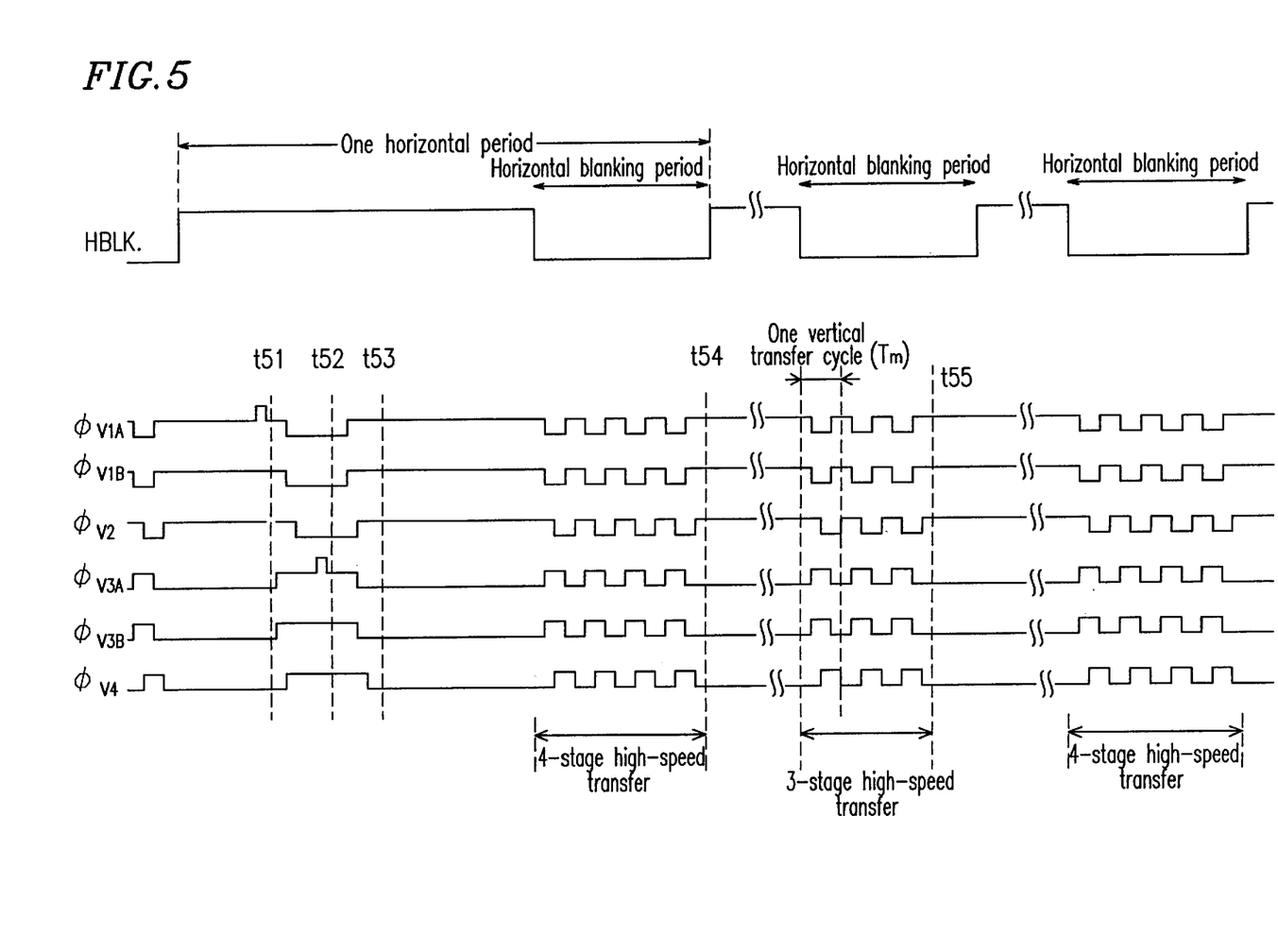
FIG. 5 illustrates a timing chart for various vertical transfer electrodes when the CCD solid-state imaging device shown in FIG. 2 is used in the conventional monitoring mode.
Figure 6:
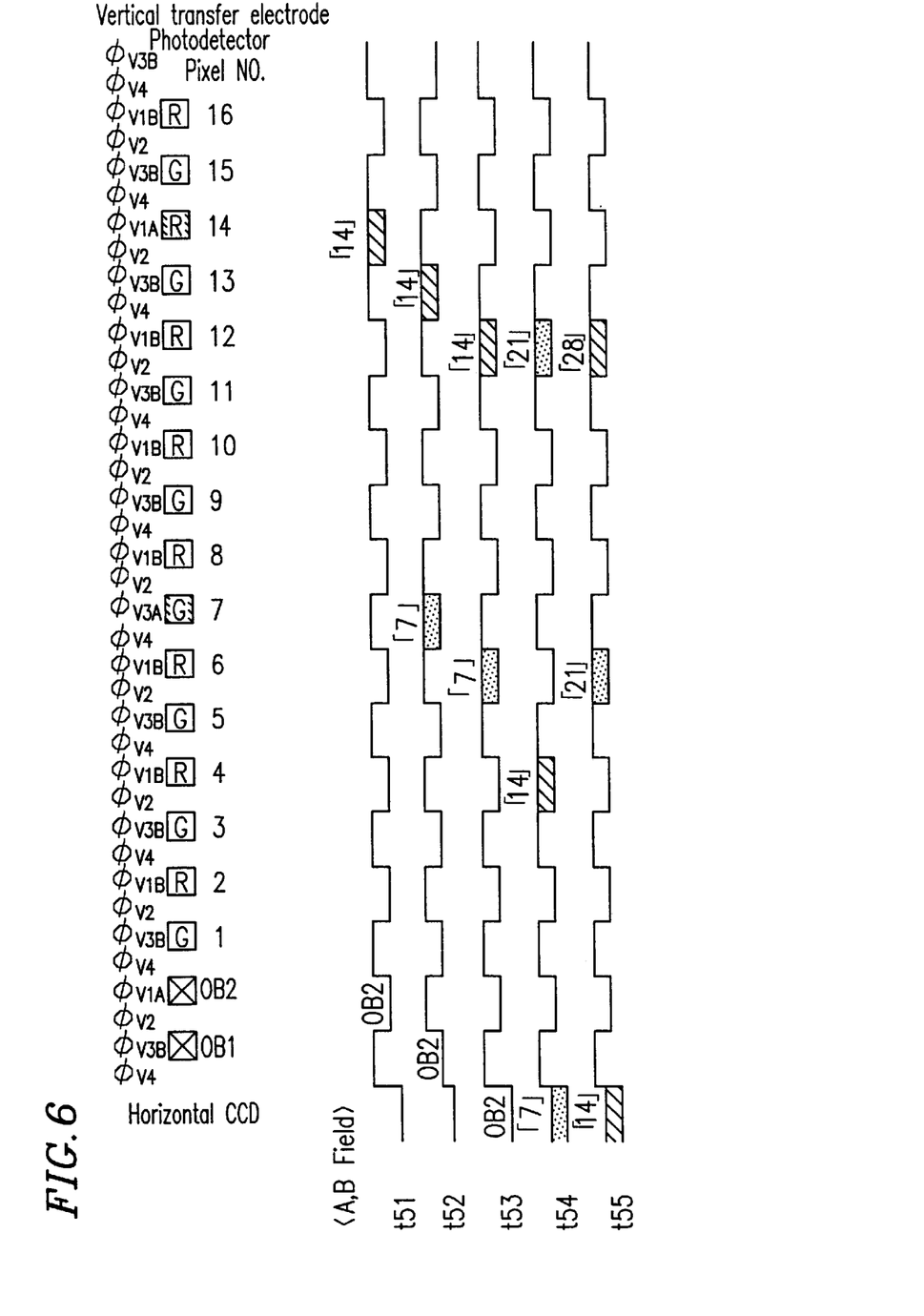
FIG. 6 is a potential diagram illustrating how signals are transferred vertically when the CCD solid-state imaging device shown in FIG. 2 is used in the conventional monitoring mode.

FIG. 5 illustrates a timing chart for the various vertical transfer electrodes 16 for the vertical CCDs 12 in the monitoring mode. FIG. 6 shows potential lines representing the respective potential states of the various vertical transfer electrodes 16 for the vertical CCDs 12 at each of the different points in the time period from t51 to t55 in FIG. 5. In FIG. 5, "Tm" denotes one vertical transfer cycle in the monitoring mode, which has a length that is ¼ of the vertical transfer cycle Ts in the still mode shown in FIG. 3.

In the monitoring mode, signals from pixels of the same color are read out for each field. First, at time t51, an R signal ⌈14⌋(a G signal for the adjacent photodetector column) from the pixel #14 corresponding to $\Phi_{V1A}$ is read out to a corresponding packet of the vertical CCD 12. The amount of data of the R (G) signal ⌈14⌋ which is read out for the A Field in the monitoring mode is 1/7 of the amount of data read out for the A Field in the still mode because there are six $\Phi_{V1B}$ gates and only one $\Phi_{V1A}$ gate.

Then, at time t52, the signal ⌈14⌋ is transferred by one packet (one step) by the 6-phase gates $\Phi_{V1A}$ to $\Phi_{V4}$. Simultaneously, a G signal ⌈7⌋ (a B signal for the adjacent photodetector column) from the pixel #7 is read out by the corresponding gate $\Phi_{V3A}$. As in the case of the R (G) signal ⌈14⌋, the amount of data of the G (B) signal ⌈7⌋ is 1/7 of the amount of data read out for the B Field in the still mode. Then, at time t53, the R (G) signal ⌈14⌋ and the G (B) signal ⌈14⌋ are transferred to the next packets, respectively. By performing such an operation, signals of R, G and B color components are read out in one field.

As shown by the potential lines shown next to "t51" and "t52" in FIG. 6, the signals (⌈7⌋ and ⌈14⌋) of two different color components are stored in the respective packets and are arranged with a 2-packet (4-pixel) or 3-packet (6-pixel) interval therebetween. Seven packets corresponding to 14 pixels are used as one unit.

Then, in a horizontal blanking period, the signal from the pixel G (B) is transferred by four packets (or four steps) (corresponding to eight pixels) to the horizontal CCD 13 at a high speed. Simultaneously, the R (G) signal ⌈14⌋, which is to be received by the horizontal CCD 13 in the next horizontal blanking period, is transferred to a packet near the horizontal CCD 13 (time t54).

In the following horizontal blanking period, the R (G) signal ⌈14⌋ is transferred by three packets (or three steps) (corresponding to six pixels) to the horizontal CCD 13. Simultaneously, the G (B) signal ⌈21⌋, which is to be read out to the horizontal CCD 13 in the next horizontal blanking period, is transferred to a packet near the horizontal CCD 13.

As described above, the vertical signal transfer operation is repeatedly performed in four steps, in three steps, in four steps, in three steps, and so on. Thus, the signals, which are arranged at intervals with two or three empty packets being interposed between the two signals being transferred, can be continuously taken out from the horizontal CCD 13 with no empty packet(s) being interposed therebetween.

The still mode and the monitoring mode can be compared as follows. With the horizontal transfer time being equal, the total data for one screen is read out in two fields in the still mode, whereas the total data is read out in ¼ of one field in the monitoring mode by performing a 1/7 decimation operation. Thus, in the monitoring mode, data can be processed at an overall frame rate that is 1/7 of that in the still mode.

For example, where a 3-million pixel imaging device is operated at a clock frequency of 18 MHz, 4.4 million clocks per frame, the amount of time required for taking out data of one screen ("frame rate") is about ¼ second in the still mode and about 1/29 second in the monitoring mode. The frame rate in the monitoring mode is comparable to that of the NTSC TV standard (1/30 second). Thus, it is possible to display smoothly moving images in the monitoring mode.

The monitoring mode realizes a continuous read operation for necessary photodetector signals from each horizontal CCD based on the combination of the "vertical decimated read operation" and the "vertical CCD multi-step signal transfer in the horizontal blanking period". The number of steps (packets) over which signals are transferred in the "vertical CCD multi-step signal transfer in the horizontal blanking period" ("the vertical transfer step number") varies depending upon the degree of decimation, and is 2 for a ¼ decimation operation, a combination of 2 and 3 for a ⅕ decimation operation, 3 for a ⅙ decimation operation, a combination of 3 and 4 for a 1/7 decimation operation, 4 for a ⅛ decimation operation, and soon. The degree of decimation is determined by the total number of pixels in the imaging device, the number of pixels required for displaying moving images, and the frame rate.

As mentioned above, the pixel density of an imaging device such as a digital still camera has been increasing. Accordingly, the degree of decimation in the monitoring mode, i.e., the vertical transfer step number, has also increased. However, the frame rate required for the monitoring mode does not change with the increase in the number of pixels. Therefore, it is necessary to increase the vertical transfer step number in a horizontal blanking period. In order to increase the vertical transfer step number in a horizontal blanking period, which is a fixed period of time, it is necessary to shorten the amount of time required for vertically transferring a signal in one step from that of the still mode, and thus to increase the vertical transfer frequency.

Figure 7:
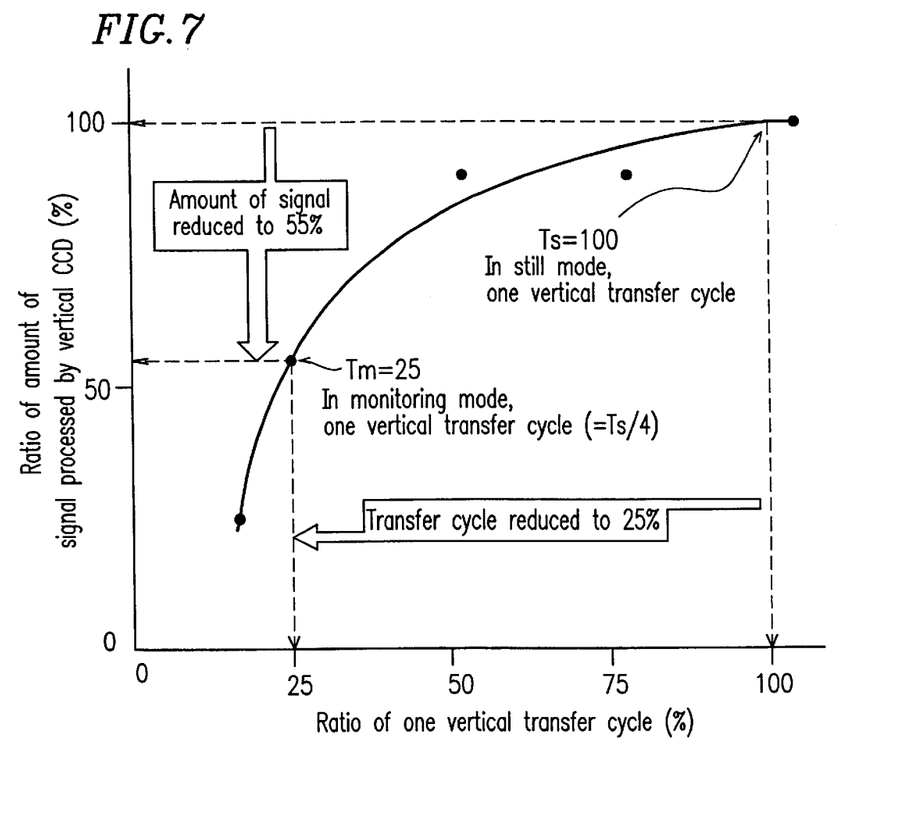
FIG. 7 is a graph illustrating the relationship between the amount of signal processed by the vertical CCD and the vertical transfer frequency.

FIG. 7 illustrates the relationship between the amount of signal processed by the vertical CCD and the driving frequency for the vertical transfer electrode. Herein, it is assumed that the amount of signal processed by the vertical CCD per packet for one vertical transfer cycle in the still mode is 100%. As shown in FIG. 7, the amount of signal processed by the vertical CCD is reduced as the frequency is increased.

Thus, where the vertical transfer frequency in the monitoring mode is greater than that in the still mode, it is not possible in the monitoring to achieve the same amount of signal processed by the vertical CCD as that in the still mode. As a result, signals read out from the photodetectors overflow in a random manner to empty packets in the adjacent vertical CCD during a vertical high-speed transfer operation in the monitoring mode, thereby causing degradation in the image quality such as unevenness or color mixing.

In the prior art, in order to address such a problem, the proportion of area per unit pixel cell that is occupied by the photodetectors or the vertical CCD has been designed so that the amount of signal processed by the vertical CCD is always greater than the amount of signal processed by the photodetector even in the monitoring mode, in which the amount of signal processed by the vertical CCD is reduced due to the frequency characteristics. The image quality degradation has been prevented by such an optimization method. However, with such a method, where the amount of signal processed by the vertical CCD is increased, it is necessary to increase the proportion of area per unit pixel cell that is occupied by the vertical CCD, which presents a drawback in increasing the pixel density.

Problems which present possible causes for the reduction in the amount of signal to be processed along with the increase in the vertical driving frequency include the reduction in the vertical CCD transfer efficiency and the bluntness of the driving signal waveform due to a gate load. These problems should be addressed. However, when the pixel density is further increased in the future, the vertical transfer frequency and the gate load will further increase, in which case the reduction in the amount of signal processed by the vertical CCD in the monitoring mode will be more serious.

SUMMARY OF THE INVENTION

According to one aspect of this invention, there is provided a method for driving a CCD solid-state imaging device. The CCD solid-state imaging device includes: a plurality of photodetector columns each including a vertical array of photodetectors; a plurality of vertical CCDs each including a plurality of packets each receiving a signal charge generated in one of the photodetectors; and a horizontal CCD provided along a horizontal direction for successively receiving the signal charges from the vertical CCDs. The method drives the CCD solid-state imaging device in a monitoring mode where the signal charges from all the photodetectors are decimated so as to use only the signal charges from some of the photodetectors. The method includes the steps of: reading a first signal charge from any one of the photodetectors into a corresponding first packet of a corresponding one of the vertical CCDs; dividing the first signal charge in the first packet into smaller portions and placing one or more of the signal charge portions of the first signal charge into one or more second empty packets of the corresponding one of the vertical CCDs; and vertically transferring the signal charge portions in the first and second packets by the total number of the first and second packets.

In one embodiment of the invention, the signal charge portions in the first and second packets are transferred to the horizontal CCD through the transfer step, and the transferred signal charge portions are mixed together at the horizontal CCD so as to reproduce the first signal charge.

In one embodiment of the invention, an amount of signal processed by the first and second packets of one of the vertical CCDs is equal to or greater than an amount of signal processed by one packet in a still mode in which the signal charges from all the photodetectors are processed without being decimated.

In one embodiment of the invention, a vertical transfer frequency of one of the vertical CCDs is greater than a vertical transfer frequency in a still mode in which the signal charges from all the photodetectors are processed without being decimated.

As already discussed in the related art section, where the vertical transfer frequency of the vertical CCD in the monitoring mode is greater than that in the still mode, the amount of signal to be processed per vertical CCD packet in the monitoring mode is lower than that in the still mode. Moreover, since a decimated read operation is performed in the monitoring mode, there are a number of empty packets between packets containing photodetector signals (see the potential line shown next to "t53" in FIG. 6). These empty packets are transferred to the horizontal CCD as signal-containing packets in the horizontal blanking period.

In view of this, according to the present invention, the operation in the monitoring mode is as follows. Before the vertical CCD driving operation is switched to a high-speed driving operation after signals are read out from the photodetectors to the vertical CCDs, i.e., before the amount of signal processed per vertical CCD packet is reduced and random overflow occurs, a signal charge from one of the photodetectors is divided into smaller portions and distributed among a plurality of vertical CCD packets. As a result, the amount of signal to be processed per packet is reduced, thereby eliminating the random signal overflow in the high-speed driving operation.

In the present application, the high-speed driving operation of the vertical CCD in the monitoring mode means a driving operation with a vertical transfer cycle shorter than that in the still mode, i.e., a vertical transfer frequency greater than that in the still mode.

After a signal charge from one of the photodetectors is divided into smaller portions and distributed among a plurality of vertical CCD packets, the portions of the divided signal charge are added together at the horizontal CCD through a vertical CCD multi-step signal transfer, thereby reproducing the original photodetector signal.

Thus, the invention described herein makes possible the advantages of providing a method for driving a CCD solid-state imaging device in which it is possible to suppress degradation of the image quality due to the reduction in the processing capacity of the vertical CCD, which occurs when a vertical signal transfer operation is performed at a high frequency in a monitoring mode.

This and other advantages of the present invention will become apparent to those skilled in the art upon reading and understanding the following detailed description with reference to the accompanying figures.

DESCRIPTION OF THE PREFERRED EMBODIMENTS

A method for driving a CCD solid-state imaging device according to the present invention will now be described in detail.

A basic feature of the present invention lies in the driving method in the monitoring mode. The driving method in the still mode is as described above with reference to FIGS. 3 and 4, and thus will not be further discussed below. Moreover, the structure of the CCD solid-state imaging device used in the following embodiment of the present invention is basically the same as that described above with reference to FIG. 1, and thus will not be further discussed below.

One embodiment of the present invention will be described below while focusing on the driving method in the monitoring mode.

Figure 8:
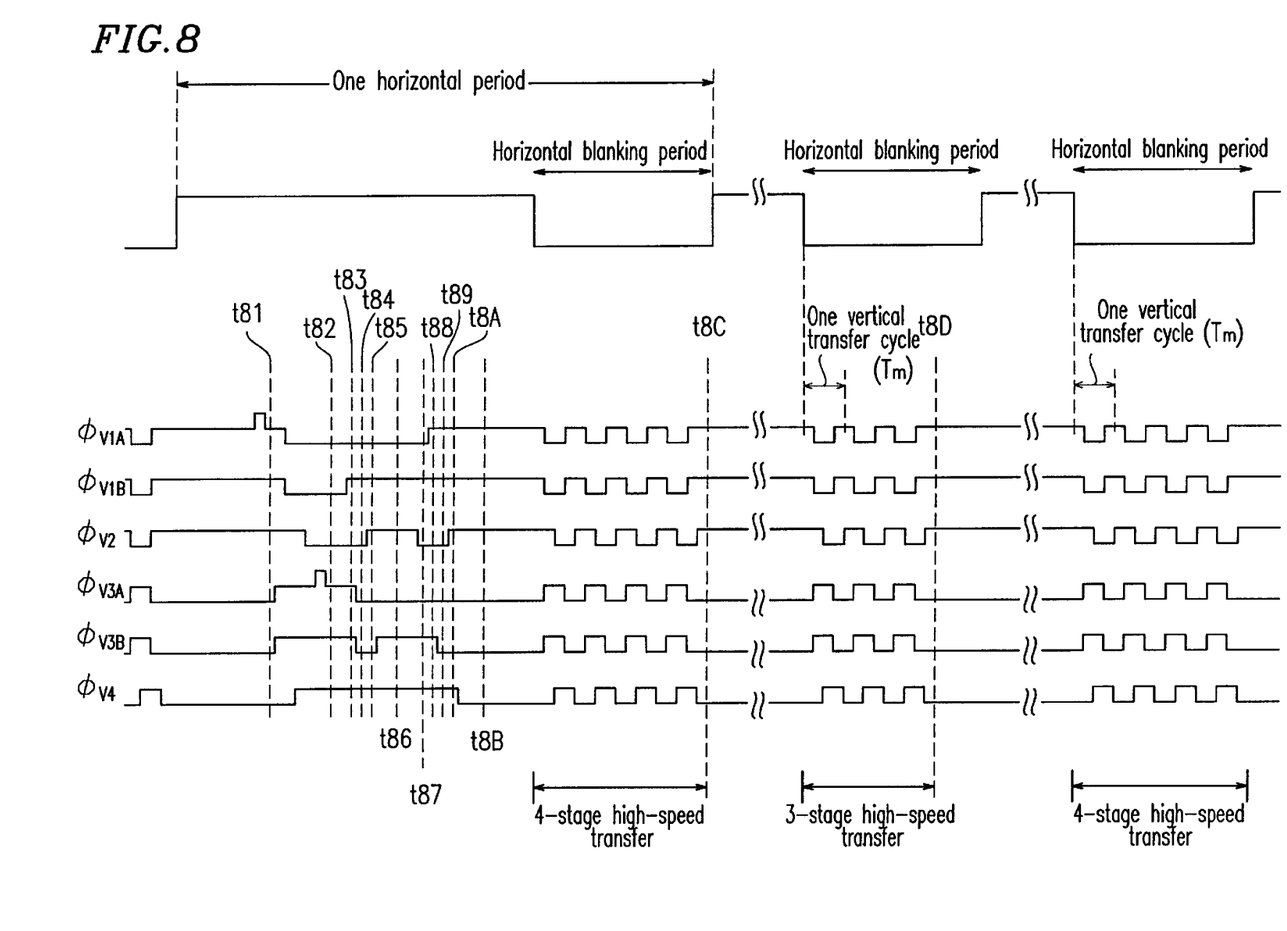
FIG. 8 illustrates a timing chart for various vertical transfer electrodes in a monitoring mode according to the present invention.
Figure 9:
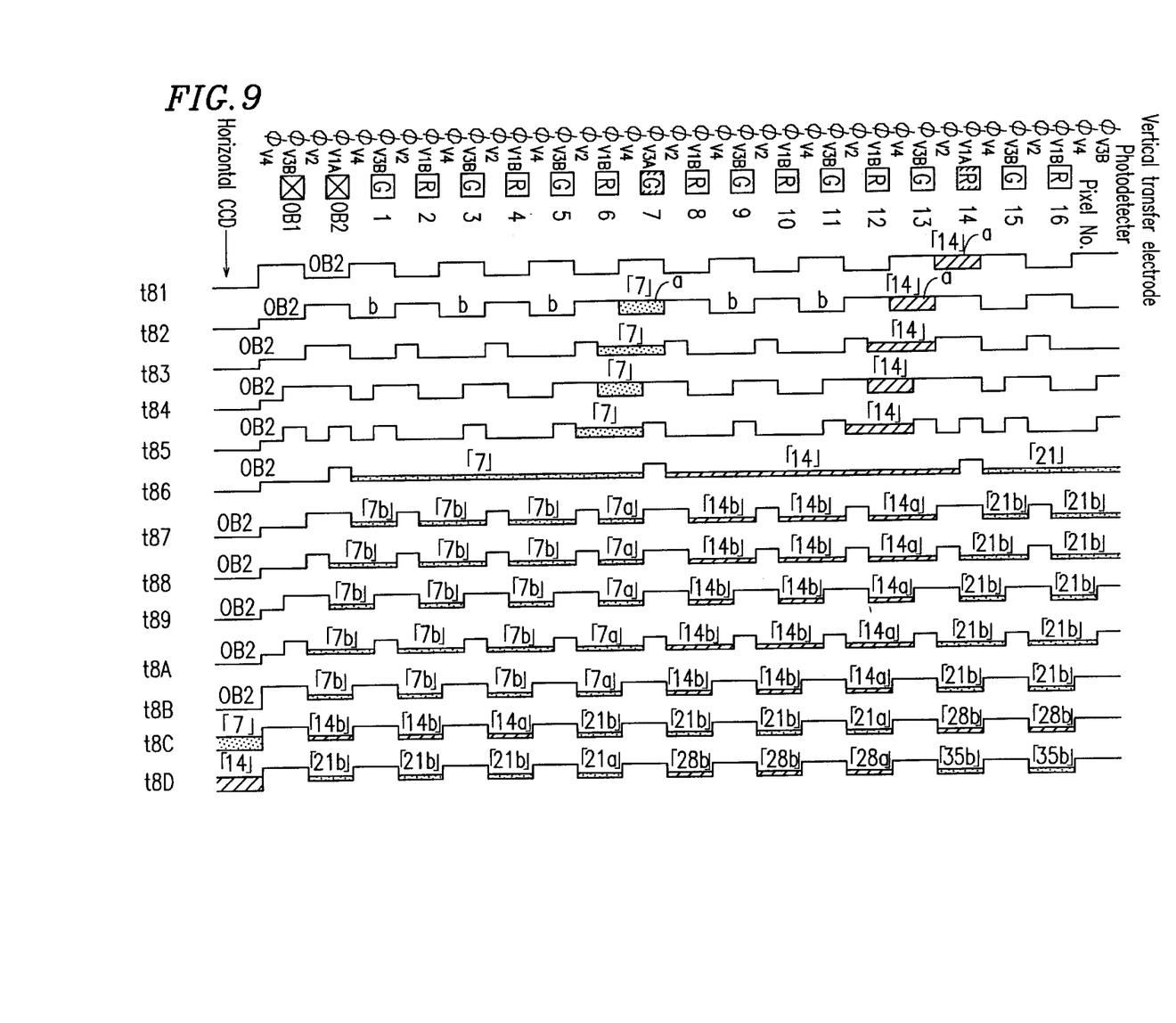
FIG. 9 is a potential diagram illustrating how signals are transferred vertically in the monitoring mode according to the present invention.

FIG. 8 illustrates a timing chart for various vertical transfer electrodes for vertical CCDs in the monitoring mode according to the present embodiment. FIG. 9 is a potential diagram illustrating how signals are transferred in a vertical CCD and the respective potential states of the various vertical transfer electrodes at various points in time t81 to t8D. In FIG. 8, the terms "one horizontal period", "horizontal blanking period", "one vertical transfer cycle" and "packet" of a vertical CCD are as defined in the description above in connection with FIGS. 3 and 4.

First, at time t81, an R signal charge ⌈14⌋ (a G signal charge for the adjacent photodetector column) from a pixel (photodetector) #14 is read out by the electrode $\Phi_{V1A}$ to a corresponding packet "a" (a first packet) of the vertical CCD 12. Then, at time t82, the signal charge ⌈14⌋ is transferred to a potential well under the electrodes $\Phi_{V3B}$ and $\Phi_{V4}$ by the gates of $\Phi_{V1A}$ to $\Phi_{V4}$ (i.e., $\Phi_{V1A}$, $\Phi_{V2}$, $\Phi_{V3B}$ and $\Phi_{V4}$). Next, a G signal charge ⌈7⌋ (a B signal for the adjacent photodetector column) from the pixel #7 is read out by the electrode $\Phi_{V3A}$ to a corresponding packet "a" (the first packet) of the vertical CCD 12. So far, the read operation is the same as the conventional read operation described with reference to FIG. 6 for reading out the photodetector signals in the monitoring mode. After the read operation described so far, the vertical CCD 12 includes empty packets b (second packets) containing no signal charge therein.

Then, from t83 to t85, the signal charges ⌈7⌋ and ⌈14⌋ are transferred so that the signal charge is distributed among the potential wells existing between $4_{V1A}$ and $\Phi_{V3A}$. Thereafter, at t86, a single photodetector signal is distributed among the potential wells under 13 gates while using $\Phi_{V1A}$ and $\Phi_{V3A}$ as barrier gates (to which a low level voltage is provided) and having the other gates $\Phi_{V1B}$, $\Phi_{V2}$, $\Phi_{V3B}$ and $\Phi_{V4}$ turned ON for being provided with a middle level voltage. Then, from t87 to t8B, the gates $\Phi_{V1A}$ to $\Phi_{V4}$ are sequentially switched from one to another so as to divide a single photodetector signal into four or three packets. By this division operation, a signal set including divided signal charges ⌈7a⌋ and ⌈7b⌋ (or ⌈14a⌋ and ⌈14b⌋) is obtained.

Thus, the photodetector signal (the signal charge ⌈14⌋ or ⌈14⌋), which has been read out to one vertical CCD packet "a" at t82, is divided into four or three successive vertical CCD packets at t8B. Each of the divided signal charges ⌈7a⌋ and ⌈7b⌋ (or ⌈14a⌋ and ⌈14b⌋) has an amount of signal that is smaller than that of the original signal charge ⌈7⌋ (or ⌈14⌋), with the total amount of signal of the divided signal charges ⌈7a⌋ and ⌈7b⌋ (or ⌈14a⌋ and ⌈14b⌋) being equal to that of the original signal charge ⌈7⌋ (or ⌈14⌋).

Thereafter, from t8B to t8C, the signal charges ⌈7⌋ and ⌈14⌋ in the vertical CCD packet are transferred over four steps (four packets) toward the horizontal CCD 13 at a high speed. As described above, in the present embodiment, the signal charge from a single photodetector is divided into a plurality of packets in the monitoring mode so as to reduce the amount of signal to be processed by each packet. Therefore, it is possible to prevent signal overflow from each packet even if the amount of signal that can be processed by a vertical CCD during a high-speed signal transfer in the vertical CCD is reduced in the monitoring mode.

The four divided G (B) signal portions ⌈7a⌋ and ⌈7b⌋ are added together by the horizontal CCD, thereby reproducing the original G (B) photodetector signal ⌈7⌋. Thereafter, from t8C to t8D, the vertical CCD packet is transferred over three steps at a high speed, so that the divided three vertical CCD packets ⌈14a⌋ and ⌈14b⌋ of the R (G) signal ⌈14⌋ are added together by the horizontal CCD, thereby reproducing the original G (B) photodetector signal ⌈14⌋. By repeating such an operation, each photodetector signal which is once divided into smaller portions is reproduced by the horizontal CCD, so that non-degraded photodetector signals can be successively taken out from the horizontal CCD.

As described above, a photodetector signal is divided into smaller portions when it is transferred and the transferred smaller portions of the photodetector signal are added together to reproduce the original photodetector signal. In this way, even though the amount of signal Vm per packet processed by the vertical CCD in a high-speed multi-step signal transfer operation after t8B is smaller than the amount of signal Vs per packet processed in the still mode, the total amount of signal per packet which can be processed in the monitoring mode is 3×Vm (or 4×Vm). Therefore, a desirable image quality is ensured even when an amount of signal comparable to the amount of signal processed in the still mode is processed in the monitoring mode. As a result, it is possible to eliminate the degradation in the image quality such as unevenness or color mixing in the monitoring mode.

According to the present invention, it is possible to process in the monitoring mode an amount of signal which is comparable to that processed in the still mode when a relationship of Vm×N≧Vs, where Vs is the amount of signal per packet processed in the still mode, Vm is the amount of signal per packet processed in the monitoring mode, and N is the number of packets into which a charge signal is divided (the total number of first and second packets).

In the above embodiment, a 1/7 decimation operation is employed. Accordingly, the vertical transfer cycle Tm in the monitoring mode is 1/3 or 1/4 of the vertical transfer cycle Ts in the still mode. Of course, the present invention can be used with other ratios between Tm and Ts which can be appropriately selected according to the degree of decimation to be used.

According to the present invention, a signal charge from one photodetector is divided into a plurality of packets in the monitoring mode. Therefore, the amount of signal to be processed by each packet is reduced, thereby preventing the signal charge from overflowing from the packet even in a high-speed vertical CCD transfer operation.

By the division of a signal charge into smaller portions, it is possible to process in the monitoring mode an amount of signal that is comparable to the amount of signal processed in the still mode. Thus, it is possible to eliminate the degradation in the image quality such as unevenness or color mixing in the monitoring mode, thereby obtaining a desirable image quality.

According to the present invention, the timing of controlling the vertical transfer electrodes is appropriately controlled. As a result, it is no longer necessary to design the device structure so that the amount of signal processed by a vertical CCD is greater than the amount of signal processed by a photodetector. Thus, it is possible to further increase the pixel density.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for driving a CCD solid-state imaging device, the CCD solid-state imaging device comprising:
   a plurality of photodetector columns each including a vertical array of photodetectors;
   a plurality of vertical CCDs each including a plurality of packets each receiving a signal charge generated in one of the photodetectors; and
   a horizontal CCD provided along a horizontal direction for successively receiving the signal charges from the vertical CCDs,
   wherein the method drives the CCD solid-state imaging device in a monitoring mode where the signal charges from all the photodetectors are decimated so as to use only the signal charges from some of the photodetectors, the method comprising the steps of:
   reading a first signal charge from any one of said some of the photodetectors into a corresponding first packet of a corresponding one of the vertical CCDs;
   dividing the first signal charge in the first packet into smaller portions and placing one or more of the signal charge portions of the first signal charge into one or more second empty packets of the corresponding one of the vertical CCDs; and
   vertically transferring the signal charge portions in the first and the one or more second packets by the total number of the first and second packets.

2. A method for driving a CCD solid-state imaging device according to claim 1, wherein the signal charge portions in the first and the one or more second packets are transferred to the horizontal CCD through the transfer step, and the transferred signal charge portions are mixed together at the horizontal CCD so as to reproduce the first signal charge.

3. A method for driving a CCD solid-state imaging device according to claim 1, wherein the total number (N) of first and the one or more second packets into which the first signal charge is divided satisfies the following relationship, where Vs is the amount of a signal per packet processed in a still mode in which signal charges from all of the photodetectors are processed without being decimated and Vm is the amount of signal per packet processed in the monitoring mode:

$N \geq Vs/Vm$.

4. A method for driving a CCD solid-state imaging device according to claim 1, further comprising the step of combining the signal charge portions in the first packet and the one or more second packets being transferred to the horizontal CCD, so as to produce a reproduced signal having an amount of charge substantially corresponding to the first signal charge.

5. A method for driving a CCD solid-state imaging device according to claim 1, wherein the amount of signal capable of being processed in the monitoring mode satisfies the following relationship, where N is the total number of the first packet and the one or more second packets into which the first signal charge is divided, Vs is the amount of a signal per packet processed in a still mode in which signal charges from all of the photodetectors are processed without being decimated and Vm is the amount of signal per packet processed in the monitoring mode:

$Vm \times N \geq Vs$.

6. A method for driving a CCD solid-state imaging device, wherein the CCD solid-state imaging device includes:
   a plurality of photodetector columns each including a vertical array of photodetectors,
   a plurality of vertical CCDs each including a plurality of packets each receiving a signal charge generated in one of the photodetectors, and
   a horizontal CCD provided along a horizontal direction for successively receiving the signal charges from the vertical CCDs;
   wherein said method drives the CCD solid-state imaging device in monitoring mode where the signal charges from all the photodetectors are decimated so as to use only the signal charges from some of the photodetectors, said method comprising the steps of:
   reading a first signal charge from any one of the photodetector into a corresponding first packet of a corresponding one of the vertical CCDs;
   dividing the first signal charge in the first packet into smaller portion and placing one or more of the signal charge portions of the first signal charge into one or more second empty packets of the corresponding one of the vertical CCDs;
   vertically transferring the signal charge portion in the first and second packets by the total number of the first and second packets; and
   wherein an amount of signal processed by the first and second packets of one of the vertical CCDs is equal to or greater than an amount of signal processed by one packet in a still mode in which the signal charges from all the photodetectors are processed without being decimated.

7. A method for driving a CCD solid-state imaging device according to claim 6, further comprising the step of combining the signal charge portions in the first and second packets being transferred to the horizontal CCD, so as to produce a reproduced signal having an amount of charge substantially corresponding to the first signal charge.

8. A method for driving a CCD solid-state imaging device according to claim 6, wherein the total number (N) of first and second packets into which the first signal charge is divided satisfies the following relationship, where Vs is the amount of a signal per packet processed in a still mode in which signal charges from all of the photodetectors are processed without being decimated and Vm is the amount of signal per packet processed in the monitoring mode:

$$N \geq Vs/Vm.$$

9. A method for driving a CCD solid-state imaging device according to claim 6, wherein the amount of signal capable of being processed in the monitoring mode satisfies the following relationship, where N is the total number of first and second packets into which the first signal charge is divided, Vs is the amount of a signal per packet processed in a still mode in which signal charges from all of the photodetectors are processed without being decimated and Vm is the amount of signal per packet processed in the monitoring mode:

$$Vm \times N \geq Vs.$$

10. A method for driving a CCD solid-state imaging device, wherein the CCD solid-state imaging device includes:
  a plurality of photodetector columns each including a vertical array of photodetectors,
  a plurality of vertical CCDs each including a plurality of packets each receiving a signal charge generated in one of the photodectors, and
  a horizontal CCD provided along a horizontal direction for successively receiving the signal charge, from the vertical CCDs;
  wherein said method drives the CCD solid-state imaging device in a monitoring mode where the signal charges from all the photodetectors are decimated so as to use only the signal charges from some of the photodetectors, said method comprising the steps of:
  reading a first signal charge from any one of the photodetectors into a corresponding first packet of a corresponding one of the vertical CCDs;
  dividing the first signal charge in the first packet into smaller portions and placing one or more of the signal charge portions of the first signal charge into one or more second empty packets of the corresponding one of the vertical CCDs;
  vertically transferring the signal charge portions in the first and second packets by the total number of the first and second packets; and
  wherein a vertical transfer frequency of one of the vertical CCDs is greater than a vertical transfer frequency in a still mode in which the signal charges from all the photodetectors are processed without being decimated.

11. A method for driving a CCD solid-state imaging device according to claim 10, further comprising the step of combining the signal charge portions in the first and second packets being transferred to the horizontal CCD, so as to produce a reproduced signal having an amount of charge substantially corresponding to the first signal charge.

12. A method for driving a CCD solid-state imaging device according to claim 10, wherein the total number (N) of first and second packets into which the first signal charge is divided satisfies the following relationship, where Vs is the amount of a signal per packet processed in a still mode in which signal charges from all of the photodetectors are processed without being decimated and Vm is the amount of signal per packet processed in the monitoring mode:

$$N \geq Vs/Vm.$$

13. A method for driving a CCD solid-state imaging device according to claim 10, wherein the amount of signal capable of being processed in the monitoring mode satisfies the following relationship, where N is the total number of first and second packets into which the first signal charge is divided, Vs is the amount of a signal per packet processed in a still mode in which signal charges from all of the photodetectors are processed without being decimated and Vm is the amount of signal per packet processed in the monitoring mode:

$$Vm \times N \geq Vs.$$

14. A method for driving a CCD solid-state imaging device, wherein the CCD solid-state imaging device includes a plurality of photodetector columns each including a vertical array of photodetectors, a plurality of vertical CCDs each including a plurality of packets each packet receiving a signal charge generated in one of the photodetectors, and a horizontal CCD provided along a horizontal direction for successively receiving the signal charges from the vertical CCDs, said method comprising the step of:
  driving the CCD solid-state imaging device in a monitoring mode where the signal charges from all the photodetectors are decimated so as to use only the signal charges from selected photodetectors, wherein said driving in a monitoring mode includes:
  reading a signal charge from any one of said selected photodetectors;
  dividing the read signal charge into smaller signal charge portions and placing one or more of the signal charge portions of the read signal charge into a corresponding first packet of a corresponding one of the vertical CCDs and one or more second empty packets of the corresponding one of the vertical CCDs;
  vertically transferring the signal charge portions in the first and the one or more second packets to the horizontal CCD by the total number of the first and second packets, and
  combining the one or more signal charge portions in the first and second packets being transferred, so as to produce a reproduced signal.

15. A method for driving a CCD solid-state imaging device of claim 14, wherein the reproduced signal has an amount of charge substantially corresponding to the signal charge being read.

16. A method for driving a CCD solid-state imaging device according to claim 15, wherein the total number (N) of first and second packets into which the first signal charge is divided satisfies the following relationship, where Vs is the amount of a signal per packet processed in a still mode in which signal charges from all of the photodetectors are processed without being decimated and Vm is the amount of signal per packet processed in the monitoring mode:

$$N \geq Vs/Vm.$$

17. A method for driving a CCD solid-state imaging device according to claim 15, wherein the amount of signal capable of being processed during the monitoring mode satisfies the following relationship, where N is the total number of the first packet and the one or more second packets into which the first signal charge is divided, Vs is the amount of a signal per packet processed in a still mode in which signal charges from all of the photodetectors are processed without being decimated and Vm is the amount of signal per packet processed in the monitoring mode:

$$Vm \times N \geq Vs.$$